US008925087B1

(12) United States Patent
Oliver et al.

(10) Patent No.: US 8,925,087 B1
(45) Date of Patent: Dec. 30, 2014

(54) APPARATUS AND METHODS FOR IN-THE-CLOUD IDENTIFICATION OF SPAM AND/OR MALWARE

(75) Inventors: Jonathan James Oliver, Kew (AU); Yifun Liang, Milpitas, CA (US)

(73) Assignee: Trend Micro Incorporated, Tokyo (JP)

( * ) Notice: Subject to any disclaimer, the term of this patent is extended or adjusted under 35 U.S.C. 154(b) by 1112 days.

(21) Appl. No.: 12/487,959

(22) Filed: Jun. 19, 2009

(51) Int. Cl.
| G06F 11/30 | (2006.01) |
| G06F 12/14 | (2006.01) |
| H04L 29/06 | (2006.01) |
| H04L 12/58 | (2006.01) |
| H04L 29/12 | (2006.01) |
| H04L 9/06 | (2006.01) |

(52) U.S. Cl.
CPC ......... H04L 63/1416 (2013.01); *H04L 61/1511* (2013.01); *H04L 9/0643* (2013.01); H04L 12/585 (2013.01); H04L 51/12 (2013.01)
USPC ........................................... 726/24; 713/188

(58) Field of Classification Search
CPC . H04L 63/14; H04L 63/1408; H04L 63/1416; H04L 9/06; H04L 9/0643; H04L 65/1076; H04L 65/1079; H04L 61/1511; H04L 12/58; H04L 12/585; H04L 51/00; H04L 51/12
USPC .............................. 726/22–24; 713/188, 187
See application file for complete search history.

(56) References Cited

U.S. PATENT DOCUMENTS

| 6,732,149 | B1 * | 5/2004 | Kephart .................... 709/206 |
| 6,732,157 | B1 * | 5/2004 | Gordon et al. ............. 709/206 |
| 6,993,660 | B1 * | 1/2006 | Libenzi et al. ............ 713/188 |
| 7,328,349 | B2 * | 2/2008 | Milliken .................... 713/181 |
| 7,367,056 | B1 * | 4/2008 | Szor et al. ................... 726/24 |
| 7,406,454 | B1 | 7/2008 | Liu et al. |
| 7,409,708 | B2 * | 8/2008 | Goodman et al. ........... 726/13 |
| 7,483,947 | B2 * | 1/2009 | Starbuck et al. .......... 709/206 |
| 7,574,409 | B2 * | 8/2009 | Patinkin ..................... 706/12 |
| 7,617,231 | B2 * | 11/2009 | Moon et al. ................... 1/1 |
| 7,716,297 | B1 * | 5/2010 | Wittel et al. ............... 709/206 |
| 7,865,561 | B2 * | 1/2011 | Kelly et al. ............... 709/206 |
| 8,205,258 | B1 * | 6/2012 | Chang et al. ................ 726/22 |
| 8,578,484 | B2 * | 11/2013 | Yu ............................... 726/22 |

(Continued)

OTHER PUBLICATIONS

Damiani et al. "An Open Digest-based Technique for Spam Detection" in Proceedings of the 2004 International Workshop on Security in Parallel and Distributed Systems. 2004. 6 pgs.*

(Continued)

*Primary Examiner* — Zachary A Davis
(74) *Attorney, Agent, or Firm* — Okamoto & Benedicto LLP

(57) ABSTRACT

One embodiment relates to an apparatus for in-the-cloud identification of spam and/or malware. The apparatus includes computer-readable code configured to be executed by the processor so as to receive queries, the queries including hash values embedded therein. The apparatus further includes computer-readable code configured to be executed by the processor so as to detect a group of hash codes which are similar and to identify the group as corresponding to an undesirable network outbreak. Another embodiment relates to an apparatus for in-the-cloud detection of spam and/or malware. The apparatus includes computer-readable code configured to be executed by the processor so as to receive an electronic message, calculate a locality-sensitive hash based on the message, embed the locality-sensitive hash into a query, and send the query to a central analysis system via a network interface. Other embodiments, aspects and features are also disclosed.

8 Claims, 8 Drawing Sheets

(56) References Cited

U.S. PATENT DOCUMENTS

| | | |
|---|---|---|
| 2003/0225841 A1 | 12/2003 | Song et al. |
| 2005/0015626 A1 | 1/2005 | Chasin |
| 2005/0108340 A1* | 5/2005 | Gleeson et al. ............... 709/206 |
| 2005/0188032 A1* | 8/2005 | Yamazaki et al. ............ 709/206 |
| 2006/0075048 A1 | 4/2006 | Gruper et al. |
| 2006/0095966 A1* | 5/2006 | Park ............................... 726/22 |
| 2006/0101334 A1 | 5/2006 | Liao et al. |
| 2007/0033645 A1 | 2/2007 | Jones |
| 2007/0038709 A1 | 2/2007 | Medvedev et al. |
| 2008/0059590 A1* | 3/2008 | Sarafijanovic et al. ....... 709/206 |
| 2010/0192222 A1* | 7/2010 | Stokes et al. .................... 726/22 |
| 2011/0093426 A1* | 4/2011 | Hoglund ......................... 706/52 |

OTHER PUBLICATIONS

Bentley, J. "Multidimensional Binary Search Trees Used for Associative Searching", Communications of the ACM, vol. 18, No. 9. Sep. 1975. 509-517.* nilsimsa "What's a nilsimsa code?", 2 sheets [retrieved on Sep. 24, 2009], retrieved from the internet: http://ixazon.dynip.com/~cmeclax/nilsimsa.html.

Bloom filter—Wikipedia, the free encyclopedia, 10 sheets [retrieved on Sep. 24, 2009], retrieved from the internet: http://en.wikipedia.org/wiki/Bloom_filter.

* cited by examiner

Image spam #1:

```
<!DOCTYPE HTML PUBLIC "-//W3C//DTD
HTML 4.0 Transitional//EN">
<HTML><HEAD><META http-
equiv=3DContent-Type content=3D"text/html;
charset=3Dkoi8-r"><META
content=3D"MSHTML 6.00.2900.2180"
name=3DGENERATOR><STYLE></STYLE>
</HEAD><BODY bgColor=3D#ffffff> <DIV>

<A href=3D"http://fvfkip.ooslz.hk/?09034006">
<IMG alt=3D"" hspace=3D0=20
src=3D"cid:000301c634d3$5e87f4f0$aa0fa8c0
@sanya" align=3Dbaseline=20 border=3D0>
</A>

</DIV></BODY></HTML>
```

FIG. 4A

Image spam #2:

```
<!DOCTYPE HTML PUBLIC "-//W3C//DTD
HTML 4.0 Transitional//EN">
<HTML><HEAD><META http-
equiv=3DContent-Type content=3D"text/html;
charset=3Dkoi8-r"><META
content=3D"MSHTML 6.00.2900.2180"
name=3DGENERATOR><STYLE></STYLE>
</HEAD><BODY bgColor=3D#ffffff> <DIV>

<FONT face=3DArial size=3D2>
<A href=3D"http://afmjkd.vvab.hk/?237887779">
<IMG alt=3D"" = hspace=3D0=20
src=3D"cid:000701c6c5da$ae97e390$0100a8c0
@alex" align=3Dbaseline=20 border=3D0>
</A>
</FONT>
</DIV></BODY></HTML>
```

FIG. 4B

Locality-sensitive hash for image spam #1:
d332254e08777dca833761948591a7c7b79667f22da62984c466b9508287ca1a

FIG. 5A

Locality-sensitive hash for image spam #2:
c7b2e54e08777daac33760968491afc7b796677029a62d84c462995088 86ca1a

FIG. 5B

|           | 1 | 2 | 3 | 4 | 5 | 6 | 7 | 8 | 9 | 10 |   | Mask | Signature |
|-----------|---|---|---|---|---|---|---|---|---|----|---|------|-----------|
| spam1     | 1 | 0 | 1 | 0 | 1 | 0 | 1 | 0 | 1 | 0  |   | X    | *         |
| spam2     | 0 | 0 | 0 | 0 | 0 | 0 | 0 | 0 | 0 | 0  |   |      | 0         |
| spam3     | 0 | 1 | 0 | 1 | 0 | 1 | 0 | 1 | 0 | 1  |   | X    | *         |
| spam4     | 1 | 1 | 1 | 1 | 1 | 1 | 1 | 1 | 1 | 1  |   |      | 1         |
| spam5     | 1 | 0 | 0 | 0 | 1 | 1 | 0 | 0 | 1 | 1  |   | X    | *         |
| spam6     | 0 | 0 | 0 | 0 | 0 | 0 | 0 | 0 | 0 | 0  |   |      | 0         |
| spam7     | 1 | 0 | 1 | 0 | 1 | 1 | 0 | 0 | 0 | 1  |   | X    | *         |
| spam8     | 1 | 1 | 1 | 1 | 1 | 1 | 1 | 1 | 1 | 1  |   |      | 1         |
| spam9     | 0 | 0 | 0 | 0 | 0 | 0 | 1 | 0 | 0 | 0  |   |      | 0         |
| spam10    | 1 | 1 | 1 | 1 | 1 | 1 | 1 | 1 | 1 | 1  |   |      | 1         |
|           | 1 | 1 | 1 | 0 | 1 | 1 | 1 | 1 | 1 | 1  |   |      | 1         |
|           | 0 | 0 | 0 | 0 | 0 | 0 | 0 | 0 | 0 | 0  |   |      | 0         |
|           | 0 | 0 | 0 | 0 | 0 | 0 | 0 | 0 | 0 | 0  |   |      | 0         |
|           | 1 | 0 | 0 | 1 | 0 | 1 | 1 | 0 | 1 | 1  |   | X    | *         |
|           | 0 | 0 | 1 | 0 | 0 | 1 | 0 | 0 | 1 | 0  |   | X    | *         |

FIG. 7

APPARATUS AND METHODS FOR IN-THE-CLOUD IDENTIFICATION OF SPAM AND/OR MALWARE

BACKGROUND

1. Field of the Invention

The present invention relates generally to communication networks, and more particularly, but not exclusively, to techniques for identifying spam and/or malware.

2. Description of the Background Art

Problems associated with unsolicited messages in electronic mail systems and malware in computer systems are well documented. Unsolicited messages, also referred to as "spam," are mass mailed by spammers to e-mail accounts over the Internet. Malware includes computer viruses, worms, phishing messages, and malicious scripts.

Various anti-spam and anti-malware techniques have been developed to combat spam and malware. For example, anti-spam software has been deployed in host computers to detect and block spam, and anti-virus software is commonly deployed in personal computers.

The domain name system (DNS) is a hierarchical naming system for resources on the Internet. A DNS blacklist (DNSBL) is a published list of known untrustworthy IP addresses (for example, those IP addresses linked to spamming) which may be checked to determine if an electronic mail (email) message is from an address known for sending out spam. Conversely, a DNS whitelist is a published list of known trustworthy IP addresses which may be used to avoid unnecessary false positive identifications of spam.

SUMMARY

One embodiment relates to an apparatus for in-the-cloud identification of spam and/or malware. The apparatus includes computer-readable code configured to be executed by the processor so as to receive queries, said queries including hash codes embedded therein. The apparatus further includes computer-readable code configured to be executed by the processor so as to detect a group of hash codes which are considered similar and to identify said group as corresponding to spam or malware.

Another embodiment relates to a method performed by executing computer-readable code on an apparatus. The apparatus receives queries that include hash codes embedded therein. The apparatus also detects a group of hash codes which are considered similar and identifies said group as corresponding to spam or malware.

Another embodiment relates to an apparatus for in-the-cloud detection of spam and/or malware. The apparatus includes computer-readable code configured to be executed by the processor so as to receive an electronic message, calculate a locality-sensitive hash based on the message, embed the locality-sensitive hash into a query, and send the query to an analysis system via a network interface.

In accordance with another embodiment of the invention, tangible computer-readable media may store computer-readable code described herein for use at a host and/or server.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 4A shows html tags of a first example of an image-based spam.

FIG. 4B shows html tags of a second example of an image-based spam.

FIG. 5A shows a locality-sensitive hash of the html tags from the first example of an image-based spam (shown in FIG. 4A).

FIG. 5B shows a locality-sensitive hash of the html tags from the second example of an image-based spam (shown in FIG. 4B).

FIG. 7 is a table showing an example group of messages identified as spam by an analysis system at a server in accordance with an embodiment of the invention.

The use of the same reference label in different drawings indicates the same or like components.

DETAILED DESCRIPTION

Applicants have determined that prior technologies to identify unsolicited messages or spam have certain disadvantages and inefficiencies. The present application discloses apparatus and methods for in-the-cloud identification of spam and/or malware, such as computer viruses, worms, phishing messages, or malicious scripts. In the present application, such spam and/or malware may be referred to jointly as undesirable network outbreaks. Advantageously, these apparatus and methods provide for the centralized monitoring of outbreaks of spam and/or malware and enable central control over the level of variants (of spam and/or malware) to be identified.

Figure 1:
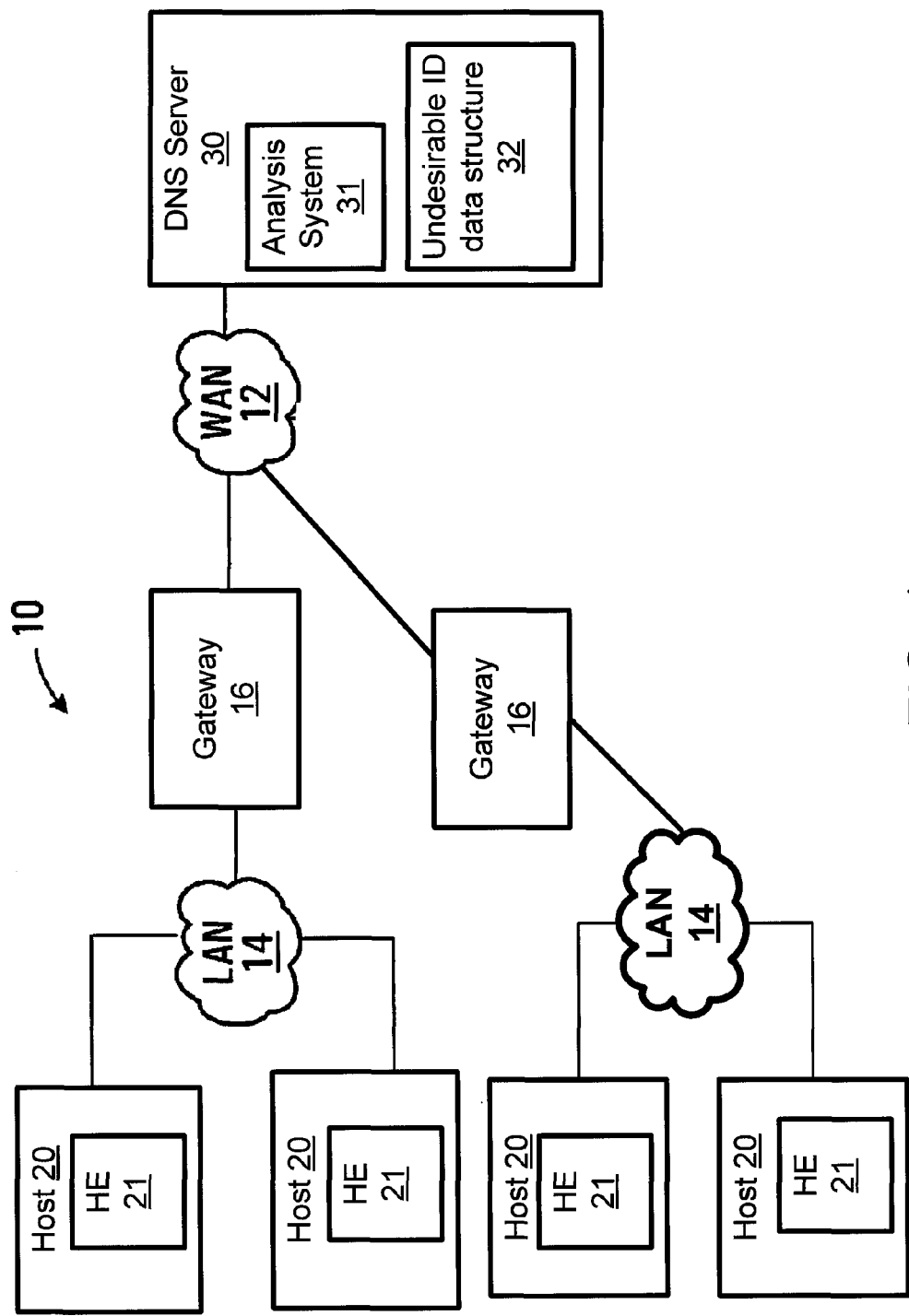
FIG. 1 is a schematic diagram depicting a data communication system in which an embodiment of the invention may be utilized.

Referring to FIG. 1, a data communication system 10 according to an embodiment of the invention is shown generally. The system includes a Wide Area Network (WAN) 12, such as an intranet or Internet, multiple Local Area Networks (LANs) (wired or wireless) 14, and gateways 16 connecting the LANs to the WAN. Two LANs are shown interconnected via the WAN, but the WAN may interconnect any number of LANs.

A plurality of personal computers (PCs) or other computer hosts 20 may be connected to each LAN 14. In accordance with an embodiment of the invention, one or more of the hosts 20 may be configured with a host engine (HE) 21.

A domain name system (DNS) server 30 may be connected to the WAN 12. The domain name system or DNS is a hierarchical naming system for resources on the Internet. In accordance with an embodiment of the invention, the DNS server 30 may be configured with an analysis system 31 and an undesirable ID data structure 32.

Figure 2:
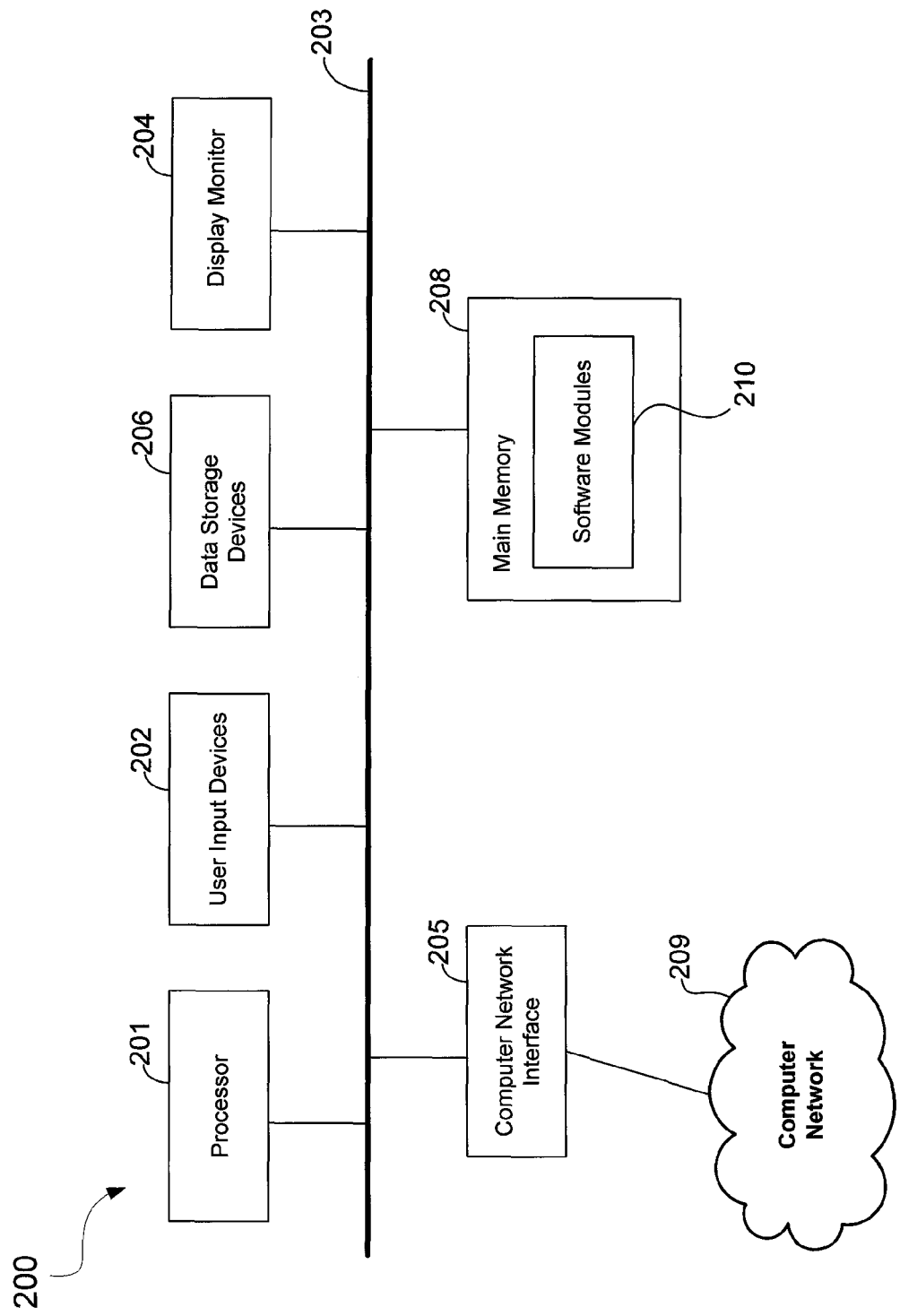
FIG. 2 is a schematic diagram depicting a computer apparatus which may be configured as a component in the implementation of in-the-cloud identification of spam and/or malware in accordance with an embodiment of the invention.

Referring now to FIG. 2, there is shown a schematic diagram of a computer apparatus 200 which may be configured as a component in the implementation of in-the-cloud identification of spam in accordance with an embodiment of the invention. The computer apparatus 200 may be employed as a host computer 20, a gateway 16, or a DNS server 30, for example. The computer 200 may have fewer or more components to meet the needs of a particular application. The computer 200 may include a processor 201, such as those from the Intel Corporation of Santa Clara, Calif., or Advanced Micro Devices of Sunnyvale, Calif., for example. The computer 200 may have one or more buses 203 coupling its various components. The computer 200 may include one or more user input devices 202 (e.g., keyboard, mouse), one or more data storage devices 206 (e.g., hard drive, optical disk, USB memory), a display monitor 204 (e.g., LCD, flat panel monitor, CRT), a computer network interface 205 (e.g., network adapter, modem), and a main memory 208 (e.g., RAM). The data storage system of the computer apparatus includes the data storage devices 206 and the main memory 208. The computer network interface 205 may be coupled to one or more data communication networks 209, which in this example may be a LAN 14 and/or a WAN 12.

In the example of FIG. 2, the main memory 208 includes software modules 210. The software modules 210 may comprise computer-readable program code (i.e., software) components of a host computer 20, a gateway 16, or a DNS server 30, for example.

The software modules 210 may be loaded from the data storage device 206 to the main memory 208 for execution by the processor 201. In accordance with an embodiment of the invention, the software modules 210 on a host computer 20 may include a host engine (HE) 21, and the software modules 210 on a DNS server 30 may include an analysis system 31. In addition, the data storage device 206 on the DNS server 30 may include an undesirable ID data structure 32.

Figure 3:
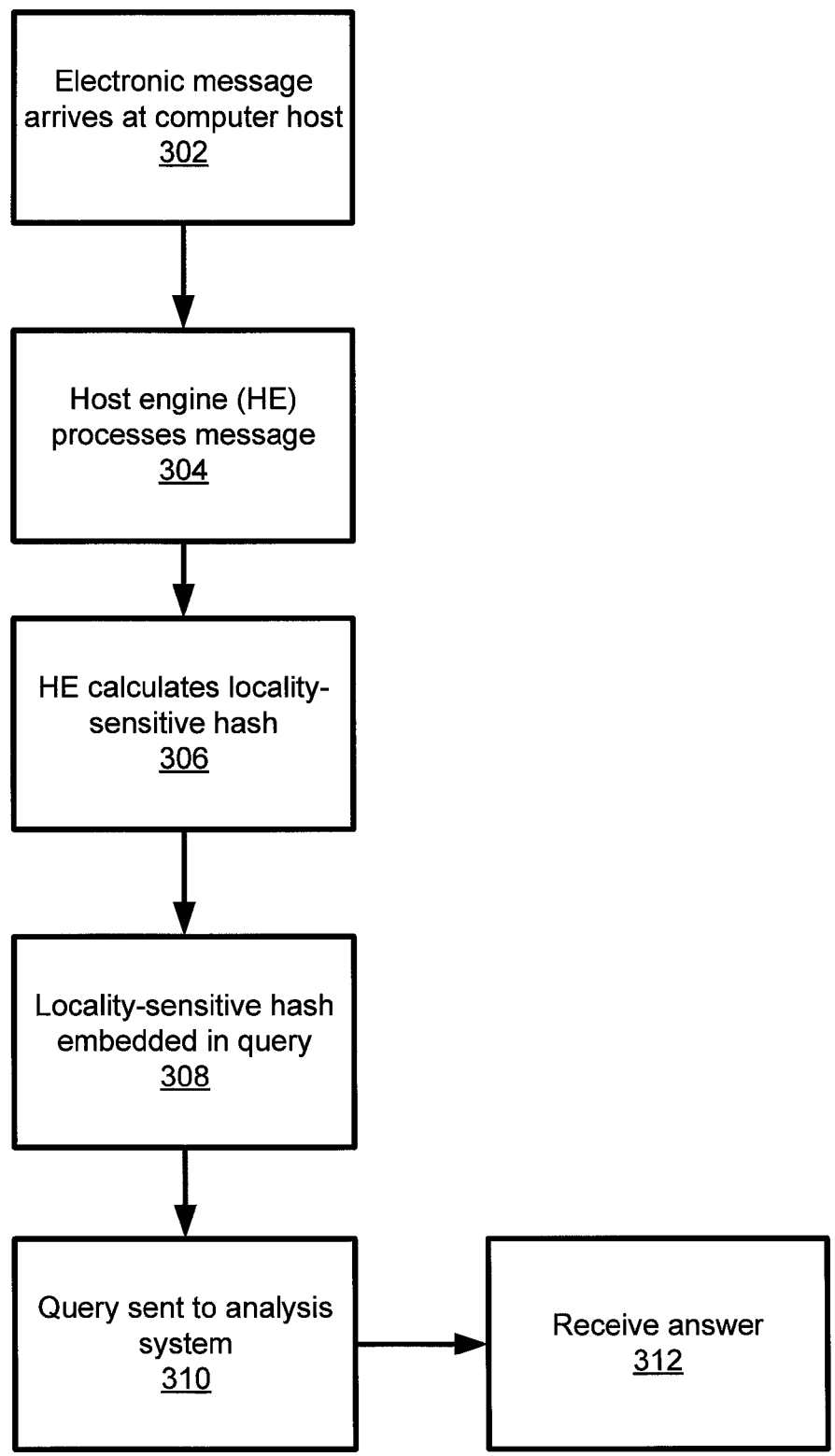
FIG. 3 is a flow chart depicting a method performed by a host engine at a host computer in accordance with an embodiment of the invention.

FIG. 3 is a flow chart depicting a method performed by a host engine (HE) 21 at a host computer 20 in accordance with an embodiment of the invention. For example, the host computer 20 may be a personal computer (desktop or laptop) connected via a LAN 14 to the Internet. As another example, the host computer may be a cellular phone configured to communicate over a telecommunication network to the Internet.

As seen in FIG. 3, an electronic message arrives 302 at the host computer. For example, the message may be an electronic mail (email) message. Alternatively, the message may be a text message.

The HE (which may be configured as a software module running on the host computer) may then process 304 the message that was received. For example, if the message is an email in hypertext markup language (HTML) format, then the HE may be configured to process the message by removing the plain text and leaving the HTML tags, or, alternatively, by removing the HTML tags and leaving the plain text. Such processing may be done before the hashing algorithm to be applied.

The HE then calculates 306 a locality-sensitive hash by applying an appropriate hashing algorithm to the message (after post processing, if any). In accordance with an embodiment of the invention, the hashing algorithm may comprise a Nilsimsa code generator. The Nilsimsa code generator may be configured to generate Nilsimsa codes which have a fixed length of 256 bits. Nilsimsa codes are locality sensitive in that a relatively small change in the message results in a relatively small change in the corresponding Nilsimsa code.

The locality-sensitive hash may then be embedded 308 in a query, and the query may be sent 310 to an analysis system. For example, a domain name system (DNS) query may be embedded with the locality-sensitive hash, and the DNS query sent out by the host computer to be received by a DNS server configured with the analysis system. Subsequently, an answer to the query may be received 312 by the HE from the analysis system.

FIG. 4A shows html code of a first example of an image-based spam. This first spam is an unsolicited electronic mail message which may be received by a user and which displays an unsolicited advertisement in an image. Similarly, FIG. 4B shows html code of a second example of an image-based spam. This second spam is an unsolicited electronic mail message which may be received by another user and may actually display the same image as the first spam.

FIG. 5A shows a locality-sensitive hash of the html code from the first example of an image-based spam (shown in FIG. 4A). Similarly, FIG. 5B shows a locality-sensitive hash of the html tags from the second example of an image-based spam (given in FIG. 4B). Each locality-sensitive hash is shown as 64 hexadecimal digits which represents 256 bits. In this example, the locality-sensitive hashes comprise Nilsimsa codes (which are 256 bits in length). Performing a difference function over the two locality-sensitive hashes indicates that the two hashes agree in 235 out of 256 bits, which is a high level of agreement. This characteristic of the locality-sensitive hashes (that similar content results in similar hash codes) allows similar spam to be grouped and identified in accordance with an embodiment of the invention.

Figure 6:
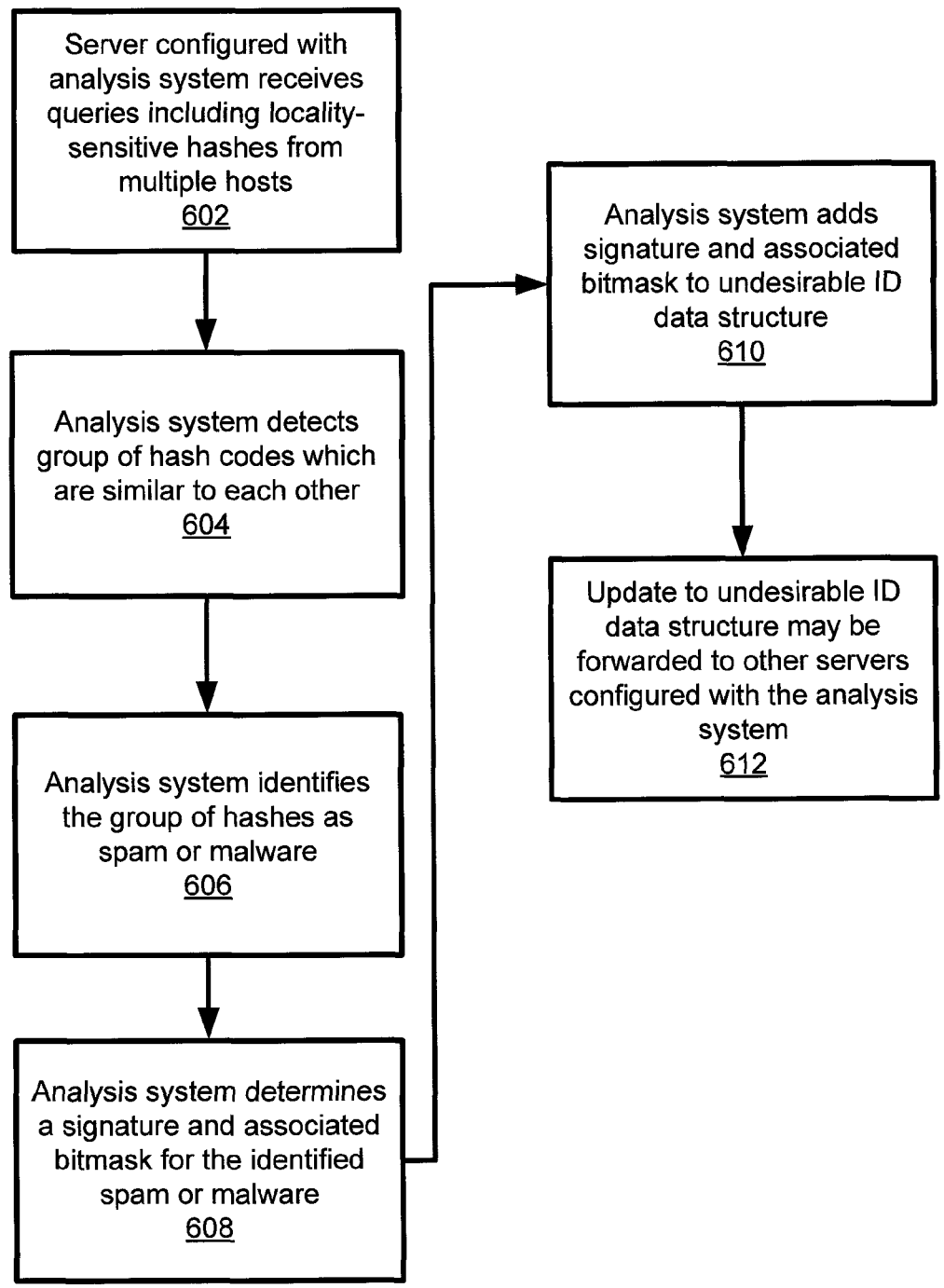
FIG. 6 is a flow chart depicting a method performed by an analysis system at a server to identify a group of messages as spam or malware in accordance with an embodiment of the invention.

FIG. 6 is a flow chart depicting a method performed by an analysis system 31 to identify a group of messages as spam or malware in accordance with an embodiment of the invention. For example, the analysis system 31 may be an in-the-cloud system which may be accessed by communicating with a server which is connected to the Internet. In one embodiment, the server may be a DNS server 30.

As seen in FIG. 6, the server configured with the analysis system 31 receives 602 queries which include locality-sensitive hashes. These queries may be received from host engines 21 at multiple hosts. For example, the hosts may comprise computers or electronic devices that are configured to receive emails or text messages from the Internet.

The analysis system 31 (which may be configured as a software module running on the server) may then determine or detect 604 a group of hash codes which are considered similar. For example, if the locally sensitive hash algorithm being used in 602 is a Nilsimsa hash, then determining that two hash codes are similar would be done by determining whether two hash codes have a number of common bits greater than a configurable threshold. The similarity measure may be configured so that less or more similarity is needed before multiple hash codes are identified as being members of a common group.

A lower similarity threshold (for example, fewer common bits in the case of using a Nilsimsa hash as the locality sensitive hash) would detect more spam messages and/or malware but may lead to more false positive identifications. On the other hand, a higher similarity threshold would lead to fewer false positive identifications but may leave more spam messages and/or malware as undetected.

The analysis system 31 may then identify 606 the group of similar locality-sensitive hashes (with a similarity measure sufficient to pass a threshold) as corresponding to spam or malware. This identification of the group of hashes as corresponding to spam may rely on other characteristics beyond the cluster of hash codes. Examples of approaches for associating this as a spam cluster may be to (i) have a spam sample from a spam trap which belongs to this group, or (ii) to look at the distribution of IP numbers which were the sources of the spam.

Once a group of similar locality-sensitive hashes is identified as spam, the analysis system 31 may determine 608 a signature for the spam or malware. One approach would be to identify a central representative hash code for the cluster. The representative samples could be in a data structure such as a KD tree for fast identification of similar hash codes. A kd (k-dimensional) tree is a space-partitioning data structure for organizing points in a k-dimensional space. A kd tree is a type of binary search tree. Another approach would involve calculation of an associated bitmask for the spam or malware cluster. Such a bitmask may be configured such that the bits which are not common are not compared against the signature, while the bits which are common are compared against the signature. An example of this approach is discussed below in relation to FIG. 7.

The analysis system 31 may then add 610 the signature (and possibly the associated bitmask) to an undesirable ID data structure 32. For example, the undesirable ID data structure 32 may be configured as a binary search tree, such as a KD tree, or other efficiently searchable data structure. Such an undesirable ID data structure 32 may be searched to determine if a newly received locality-sensitive hash value matches a signature/mask for a spam. The analysis system 31 may also forward 612 the update (new addition) to the undesirable ID data structure 32 to other servers configured with the analysis system 31.

FIG. 7 is a table showing an example group of messages identified as spam by an analysis system at a server in accordance with an embodiment of the invention which uses a bitmask in association with the spam signature. The table shows a sample series of bits of a locality-sensitive hash for ten variants of an example spam. The actual hash codes would generally be longer, but only seventeen bits are shown for purposes of illustration.

Below the ten variants of the example spam are shown bits for a signature and corresponding mask for the spam. As seen, the bits with common values amongst the spam variants are made part of the signature, and the bits that do not have common values amongst the spam variants are masked off so that they are not part of the signature.

Figure 8:
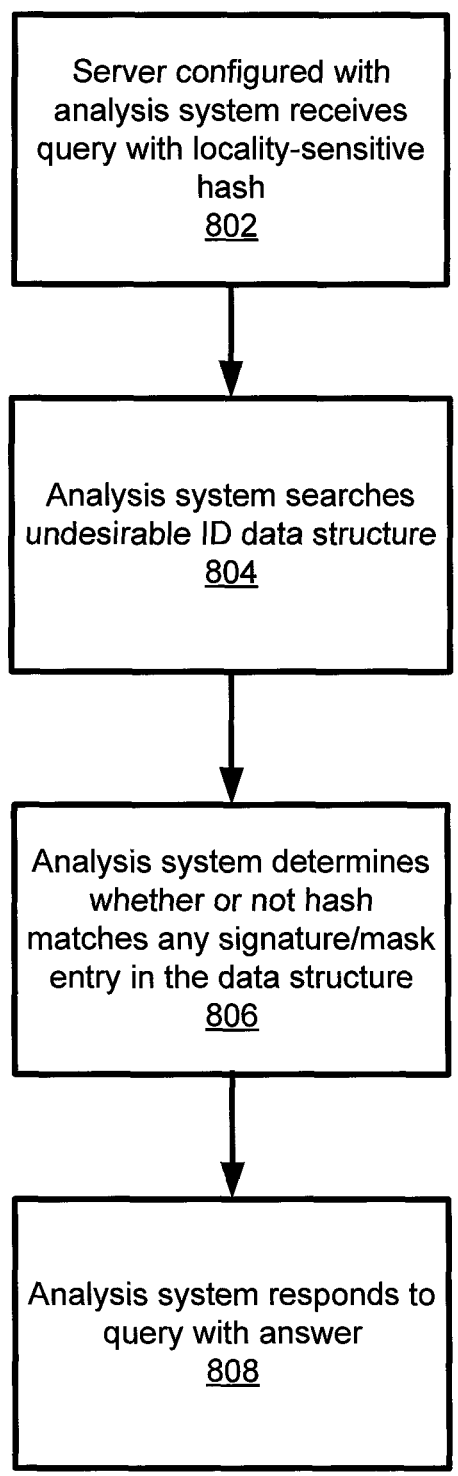
FIG. 8 is a flow chart depicting a method performed by an analysis system to check whether or not a message is considered to be spam or malware in accordance with an embodiment of the invention.

FIG. 8 is a flow chart depicting a method performed by an analysis system 31 to check whether or not a message or file is considered to be spam or malware in accordance with an embodiment of the invention. For example, the analysis system 31 may be at a server which is connected to the Internet. In one embodiment, the server may be a DNS server 30.

As seen in FIG. 8, the server configured with the analysis system 31 receives 802 a query which includes a locality-sensitive hash code. The query may be received from a computer or other electronic device that is configured with a host engine 21.

The analysis system 31 (which may be configured as a software module running on the server) may then search 804 the undesirable ID data structure 32 to determine 806 whether or not the locality-sensitive hash matches any signature/mask entry in the data structure. The analysis system 31 may then respond 808 to the query by returning an answer to the inquiring HE 21. The answer may indicate whether or not the hash code indicates that the corresponding message or file is spam or malware.

Improved apparatus and methods for identification of spam have been disclosed herein. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for detecting undesirable network outbreaks, the system comprising a plurality of domain name servers, each domain name server in the plurality of domain name servers comprising:
   a data storage system configured to store computer-readable code and data;
   a network interface communicatively connected to a network and configured to receive and send data via the network;
   a processor configured to access the data storage system and to execute said computer-readable code; and
   computer-readable code stored in the data storage system and configured to be executed by the processor so as to:
      receive a plurality of domain name system queries via the network interface, said plurality of domain name system queries including locality-sensitive hash codes embedded therein, wherein the locality-sensitive hash codes are generated from a message in hypertext markup language format by removing plain text and leaving hypertext markup language tags before applying a hashing algorithm;
      detect, from said plurality of domain name system queries, a group of the locality-sensitive hash codes which are similar to each other in that the group of the locality-sensitive hash codes has a number of bits in common that is greater than a threshold number of bits;
      identify said group of locality-sensitive hash codes as corresponding to a cluster based on a distribution of internet protocol addresses of sources of said plurality of domain name system queries;
      determine a signature and associated bitmask for said group of the locality-sensitive hash codes identified as corresponding to the cluster;
      add the signature and associated bitmask for the cluster to an undesirable identifier data structure; and
      forward the signature and associated bitmask to other domain name servers of the plurality of domain name servers via the network.

2. The system for detecting undesirable network outbreaks of claim 1, wherein the locality-sensitive hash codes comprise Nilsimsa codes.

3. A method for detecting undesirable network outbreaks performed by executing computer-readable code in a domain name server which includes a data storage system configured to store the computer-readable code and data, a network interface communicatively connected to a network and configured to receive and send data via the network, and a processor configured to access the data storage system and to execute said computer-readable code, the method comprising:
   receiving a plurality of domain name system queries via the network interface, the plurality of domain name system queries including hash values embedded therein, wherein the hash values are generated by removing a first predetermined portion of electronic mail messages and leaving a second predetermined portion of the electronic mail messages before applying a hashing algorithm, wherein the first predetermined portion comprises plain text and the second predetermined portion comprises hypertext markup language tags;
   detecting a group of the hash values from within said plurality of domain name system queries with a similarity measure above a configurable threshold;
   identifying said group of the hash values as corresponding to an undesirable network outbreak; and determining a signature and an associated bitmask for said group of the hash values.

4. The method of claim 3, wherein the hash values are generated by a Nilsimsa code generator.

5. The method of claim 3, wherein the group of the hash values has a number of bits in common which is greater than a configurable threshold number.

6. The method of claim 3, further comprising adding said signature and associated bitmask as an entry in a data structure stored in the data storage system.

7. The method of claim 6, further comprising: searching the data structure to determine whether a hash value from a newly-received query matches any entry in the data structure; and responding to the newly-received query with an answer via the network interface.

8. A computer host comprising:
a data storage system configured to store computer-readable code and data;
a network interface communicatively connected to a network and configured to receive and send data via the network;
a processor configured to access the data storage system and to execute said computer-readable code;
computer-readable code stored in the data storage system and configured to be executed by the processor so as to receive an electronic message via the network interface;
computer-readable code stored in the data storage system and configured to be executed by the processor so as to remove a first predetermined portion of the electronic message and leave a second predetermined portion of the electronic message before calculating a locality-sensitive hash code, wherein the first predetermined portion comprises plain text and the second predetermined portion comprises hypertext markup language tags;
computer-readable code stored in the data storage system and configured to be executed by the processor so as to calculate the locality-sensitive hash code based on the second predetermined portion of the electronic message;
computer-readable code stored in the data storage system and configured to be executed by the processor so as to embed the locality-sensitive hash code into a domain name system query; and
computer-readable code stored in the data storage system and configured to be executed by the processor so as to send the domain name system query to a domain name server via the network interface, wherein the domain name server receives the domain name system query having the locality-sensitive hash code embedded therein and includes an analysis system to detect a group of locality-sensitive hash codes embedded in domain name system queries which are similar to each other using an associated bitmask and identify said group as corresponding to a cluster.

* * * * *